UNITED STATES PATENT OFFICE.

NATHANIEL S. KEITH, OF BROOKLYN, NEW YORK.

IMPROVEMENT IN PROCESSES FOR REFINING IMPURE LEAD.

Specification forming part of Letters Patent No. 209,056, dated October 15, 1878; application filed April 11, 1878.

*To all whom it may concern:*

Be it known that I, NATHANIEL SHEPARD KEITH, of Brooklyn, in the State of New York, have invented a new and Improved Process of Refining Impure Lead and separating from such lead its contents of gold, silver, and other metals, of which the following is a specification:

This process consists in dissolving the lead by solvents excited by electricity, leaving the impurities undissolved, and at the same operation depositing the lead separately in a purified form.

There are two modes or processes now practiced in the art of refining lead and separating its contents of gold and silver. One is known as the "Pattinson" or "crystallizing" process and the other as the zinc process. As they are well known to metallurgists, and as my invention does not resemble either of them, they need not be described.

In carrying out my invention, I use one or more electrolyzing-baths, composed of a solution of a salt of lead, in which I make impure lead the anode or positive pole of an electric battery and any metallic or other solid electric conductor the cathode or negative pole of the battery. I have used with success solutions of acetate of lead, of chloride of lead, and of nitrate of lead, each made acid by either acetic or hydrochloric acid. I have discovered that this acidulation prevents the formation of the subsalts and oxides upon the electrodes and in the solutions which are formed in the use of normal solutions of the neutral salts of lead. When these form, the electrolytic action gradually grows less, and finally ceases altogether. At best it is imperfectly carried on in normal solutions.

It is necessary to use solutions of salts of lead, which, under the exciting influence of electricity as applied in an electrolyzing-bath, do not dissolve gold, silver, and other constituents of commercial impure lead, pig-lead, or of lead which is known in the market by the name "base bullion." I have found that the solutions I have hereinbefore named—namely, the solutions of the acetate, chloride, and nitrate of lead, made acid, as described—do not dissolve those impurities, while they readily dissolve lead when electrolytically treated.

I have used various other solutions, notably those of oxide of lead in solutions of caustic potash and caustic soda; but I prefer above all a solution of acetate of lead in water made acid by acetic acid. I prefer nearly saturated solutions, though almost any strength of solution may be used.

Having, by preference, cast or rolled some of the impure lead into the form of plates or sheets, I surround these forms with covers made of some textile material like cotton, linen, or wool, of sufficient fineness of texture to retain the insoluble constituents of the impure lead. These covers are preferably made in the form of a bag. I then immerse the covered forms of lead in the bath, and put them in electrical connection with the positive pole of the battery, thus making them the anode of the bath. To the negative pole I attach a sheet or sheets of copper, brass, lead, or other metal, or carbon immersed in the bath, thus making it or them the cathode.

I procure the necessary current of electricity from any source, but preferably from magneto-electric or dynamo-electric machines, in well-known ways. As long as a current of electricity flows in this circuit lead is dissolved from the anode and deposited in a pure crystalline metallic form on the cathode, from which it may be removed for melting into commercial shape or otherwise utilized. Such gold, silver, antimony, copper, tin, iron, &c., as may be in the anode remain undissolved, and gradually drop off the surface of the anode in the shape of a fine powder into properly-placed receptacles, whence the powder may be removed for subsequent refining or melting or sale. This bag, or its equivalent cover, I have found necessary to prevent currents in the solutions where there is agitation of the bath, carrying the powder of undissolved impurities and depositing it in the separated lead.

I increase the size and number of the electrolyzing-baths to accord with the necessary extent of the operation. I have found that if I arrange two or more baths for electrolyzing lead, so that the cathode of the first bath is electrically connected with the anode of the second bath, and the cathode of the second bath is electrically connected with the anode of the third bath, and so on through any number, though the resistance to the current thus added decreases the current passing and the amount of lead dissolved and deposited in any one of the series, the aggregate amount of lead dissolved and deposited is increased with a corresponding decrease in the consumption of zinc and acid in the galvanic battery connected therewith, or a corresponding decrease in the power used to drive the electric machine connected therewith in such a case. In this way I make a great saving in the expense of the electricity needed for electrolyzing a large amount of lead. I have also found that by heating the solutions I use for electrolyzing lead their conductivity is much increased, so that electric batteries or machines of less electro-motive force may be used, thus increasing the economy.

As I prevent the formation of subsalts and oxides on the electrodes and in the solutions, I get the full electric equivalent of lead dissolved and deposited for the electricity used, and the solutions are not decomposed.

I am aware that lead has been deposited from solutions of its salts, such as the nitrate and acetate, and from solutions of oxide of lead in caustic soda or caustic potash liquors; but I believe that it has only been done in an experimental way and with normal solutions of the neutral salts, and that its electrolysis has not been made of any practical use in the arts until my invention. With these solutions it has not been possible to continue the electrolysis for any considerable length of time, owing to the formation of oxides and subsalts on the electrodes and in the solutions, thus decomposing the solutions and stopping the electrolytic action by reason of the non-conducting coating on the electrodes and the changed character of the solutions. I believe I am the first person to use an anode of impure lead for the purpose of its purification.

I do not claim, broadly, the electrolysis of lead in every manner and form. I do not claim electrolyzing solutions made of the normal salts of lead when neutral.

I claim—

1. The process of refining impure lead by making it an anode in an electrolyzing-bath of a salt of lead so prepared as to prevent the formation of oxides or subsalts, and so as not to dissolve the impurities of the anode, substantially as described.

2. In the process of purifying lead by electrolysis, the herein-described electrolyzing solutions, composed of solutions of either acetate or chloride or nitrate of lead, or mixtures of the same, said solutions being made acid by means of either acetic or hydrochloric acids.

3. The herein-described process of separating gold, silver, and other metals from lead, rendering them easy of refinement, and also at the same time obtaining metallic lead in a pure state suitable for manufacturing purposes, by means of electricity, the same consisting in the employment of acid solutions of lead salts in the bath, with an anode of impure lead—the material to be purified.

4. In the process of purifying lead and separating its contents of gold, silver, and other metals by electrolysis, the means employed for retaining the insoluble impurities, keeping them from mixing with the purified lead, the same being a cover of muslin, or equivalent material, surrounding the anode.

N. S. KEITH.

Witnesses:
I. B. CHAFFEE,
JOHN C. MULFORD.